US010567451B2

(12) United States Patent
Lee et al.

(10) Patent No.: US 10,567,451 B2
(45) Date of Patent: Feb. 18, 2020

(54) METHOD OF PROVIDING AUTOMOTIVE MIRACAST AND APPARATUS THEREFOR

(71) Applicant: LG ELECTRONICS INC., Seoul (KR)

(72) Inventors: Kwanghee Lee, Seoul (KR); Namsu Lee, Seoul (KR); Sangwoo Han, Seoul (KR); Byungjoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 15/730,331

(22) Filed: Oct. 11, 2017

(65) Prior Publication Data

US 2018/0103076 A1    Apr. 12, 2018

Related U.S. Application Data

(60) Provisional application No. 62/406,939, filed on Oct. 11, 2016.

(51) Int. Cl.
*H04L 29/06*    (2006.01)
*H04W 84/12*    (2009.01)
*H04W 4/80*    (2018.01)

(52) U.S. Cl.
CPC ........ *H04L 65/4069* (2013.01); *H04L 65/608* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 2003/0229900 | A1* | 12/2003 | Reisman | G06F 16/954 725/87 |
| 2007/0271606 | A1* | 11/2007 | Amann | H04W 12/02 726/15 |
| 2008/0080703 | A1* | 4/2008 | Penning | H04M 1/6066 379/428.02 |
| 2015/0135206 | A1* | 5/2015 | Reisman | H04N 21/26283 725/18 |
| 2015/0135214 | A1* | 5/2015 | Reisman | H04N 21/64322 725/37 |
| 2016/0105291 | A1* | 4/2016 | Anchan | H04L 12/189 |
| 2016/0105500 | A1* | 4/2016 | Anchan | H04L 67/1051 370/329 |
| 2017/0312626 | A1* | 11/2017 | Colenbrander | A63F 13/355 |

* cited by examiner

*Primary Examiner* — Davoud A Zand
(74) *Attorney, Agent, or Firm* — Birch, Stewart, Kolasch & Birch, LLP

(57) ABSTRACT

The present specification may provide a method of streaming provided to a WFD sync device by a WFD source device in a wireless communication system. In this case, the method may include the steps of transmitting an M3 request message to the WFD sync device to request WFD BT information, receiving an M3 response message including a BT name of the WFD sync device and BT address information of the WFD sync device from the WFD sync device, transmitting an M4 request message including a BT name of the WFD source device and BT address information of the WFD source device to the WFD sync device, receiving an M4 response message from the WFD sync device, and establishing a WFD session with the WFD sync device and providing the streaming to the WFD sync device.

15 Claims, 19 Drawing Sheets

METHOD OF PROVIDING AUTOMOTIVE MIRACAST AND APPARATUS THEREFOR

CROSS REFERENCE TO RELATED APPLICATIONS

This non-provisional application claims the benefit under 35 U.S.C. § 119(e) to U.S. Provisional Application No. 62/406,939, filed on Oct. 11, 2016, all of which are hereby expressly incorporated by reference into the present application.

BACKGROUND OF THE INVENTION

Field of the Invention

The present specification relates to a wireless communication system, and more particularly, to a method of providing Automotive Miracast in a wireless communication system and an apparatus therefor.

Discussion of the Related Art

Wireless access systems have been widely deployed to provide various types of communication services such as voice or data. In general, a wireless communication system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. Meanwhile, Wi-Fi P2P maintains most of functions of the legacy Wi-Fi standard and includes an additional part for supporting direct communication between devices. Hence, the Wi-Fi P2P may sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed.

SUMMARY OF THE INVENTION

An object of the present specification is to provide a method of providing automotive Miracast in a wireless communication system and an apparatus therefor.

Another object of the present specification is to provide a method of connecting a mobile terminal with a vehicle based on a WFD session in a wireless communication system.

Another object of the present specification is to provide a method of exchanging information for automotive Miracast based on an RTSP (real time streaming protocol) message in a wireless communication system.

The other object of the present specification is to provide an operation method of WFD terminals in consideration of information on whether or not a vehicle is moving.

According to an embodiment of the present invention, a method of streaming provided to a WFD (Wi-Fi Direct) sync device by a WFD source device in a wireless communication system, the method comprising: transmitting an M3 request message to the WFD sync device to request WFD BT (Bluetooth) information; receiving an M3 response message containing a BT name of the WFD sync device and BT address information of the WFD sync device from the WFD sync device; transmitting an M4 request message containing a BT name of the WFD source device and BT address information of the WFD source device to the WFD sync device; receiving an M4 response message from the WFD sync device; and establishing a WFD session with the WFD sync device and providing the streaming to the WFD sync device.

In addition, according to an embodiment of the present invention, in a wireless communication system, a WFD source device providing a streaming in a wireless communication system, the WFD source device comprising: a reception module configured to receive information from an external device; a transmission module configured to transmit information to an external device; and a processor configured to control the reception module and the transmission module, wherein the processor configured to: control the transmission module to transmit an M3 request message to the WFD sync device to request WFD BT information, control the reception module to receive an M3 response message containing a BT name of the WFD sync device and BT address information of the WFD sync device from the WFD sync device, control the transmission module to transmit an M4 request message containing a BT name of the WFD source device and BT address information of the WFD source device to the WFD sync device, control the reception module to receive an M4 response message from the WFD sync device, and establish a WFD session with the WFD sync device and provide the streaming to the WFD sync device.

Moreover, the following items can be commonly applied to a method and apparatus for streaming in a wireless communication system.

According to an embodiment of the present invention, whether the streaming is provided is determined based on whether the WFD sync device is driving.

According to an embodiment of the present invention, the M3 request message further comprises whitelist application request information, the M3 response message comprises whitelist application information of the WFD sync device, and a whitelist application of the WFD sync device corresponds to an application list capable of being displayed in a driving status of the WFD sync device.

According to an embodiment of the present invention, whether an application of the provided streaming is contained in the whitelist application of the WFD sync device is determined when the WFD sync device is driving.

According to an embodiment of the present invention, a steaming for a blocked screen is provided to the WFD sync device when the application of the provided streaming is not contained in the whitelist application of the WFD sync device.

According to an embodiment of the present invention, an M17 request message containing information indicating the parking status is received from the WFD sync device and an M17 response message is transmitted to the WFD sync device based on the M17 request message when the WFD sync device is switched to a parking status from a driving status.

According to an embodiment of the present invention, an M18 request message containing information indicating a status of an execution screen is transmitted to the WFD sync device and a streaming for the execution screen is provided to the WFD sync device when the M17 request message is received in a state of providing a blocked screen to the WFD sync device.

According to an embodiment of the present invention, the WFD source device corresponds to a mobile device and wherein the WFD sync device corresponds to a vehicle or an HU (head unit) of the vehicle.

According to the present specification, it is able to provide automotive Miracast in a wireless communication system.

According to the present specification, it is able to provide a method of connecting a mobile terminal with a vehicle based on a WFD session in a wireless communication system.

According to the present specification, it is able to provide a method of exchanging information for performing automotive Miracast based on an RTSP message in a wireless communication system.

According to the present specification, it is able to provide an operation method of WFD terminals in consideration of information on whether or not a vehicle is moving.

Effects obtainable from the present invention may be non-limited by the above mentioned effect. And, other unmentioned effects may be clearly understood from the following description by those having ordinary skill in the technical field to which the present invention pertains.

DETAILED DESCRIPTION OF THE INVENTION

Figure 1:
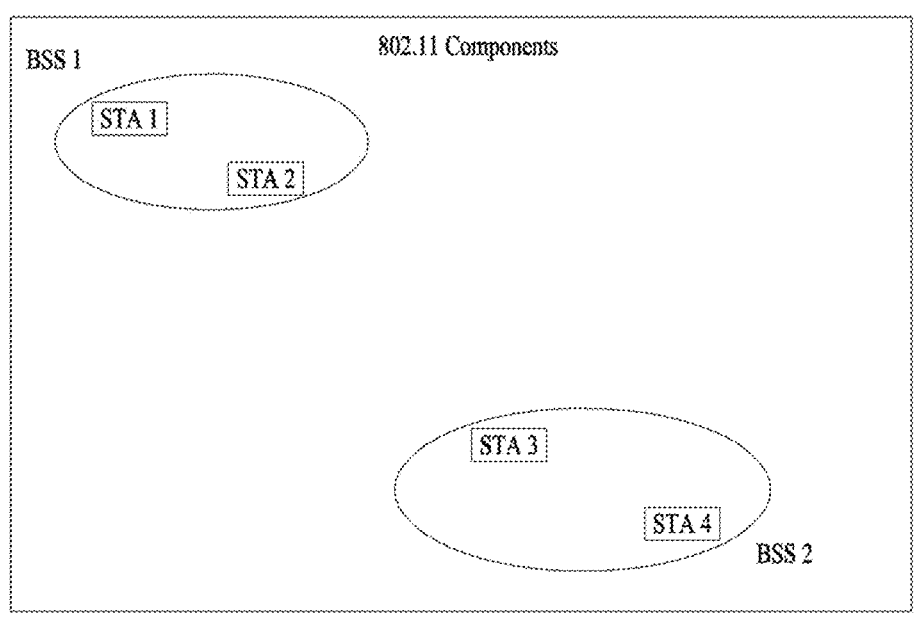
FIG. 1 is a diagram for an example of a structure of IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that may be implemented according to the present invention. The following detailed description includes specific details in order to provide the full understanding of the present invention. However, it will be apparent to those skilled in the art that the present invention may be implemented without such specific details.

The following embodiments may be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention may be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following embodiments of the present invention may be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/GPRS/EDGE (Global System for Mobile communications/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure may consist of a plurality of configuration elements and a WLAN supporting mobility of an STA, which is transparent to an upper layer, may be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP may be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA may be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area may be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN may be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS may be dynamically changed. In order to be a member of the BSS, the STA may join the BSS using a synchronization process. In order to access all services based on a BSS structure, the STA may be associated with the BSS.

Figure 2:
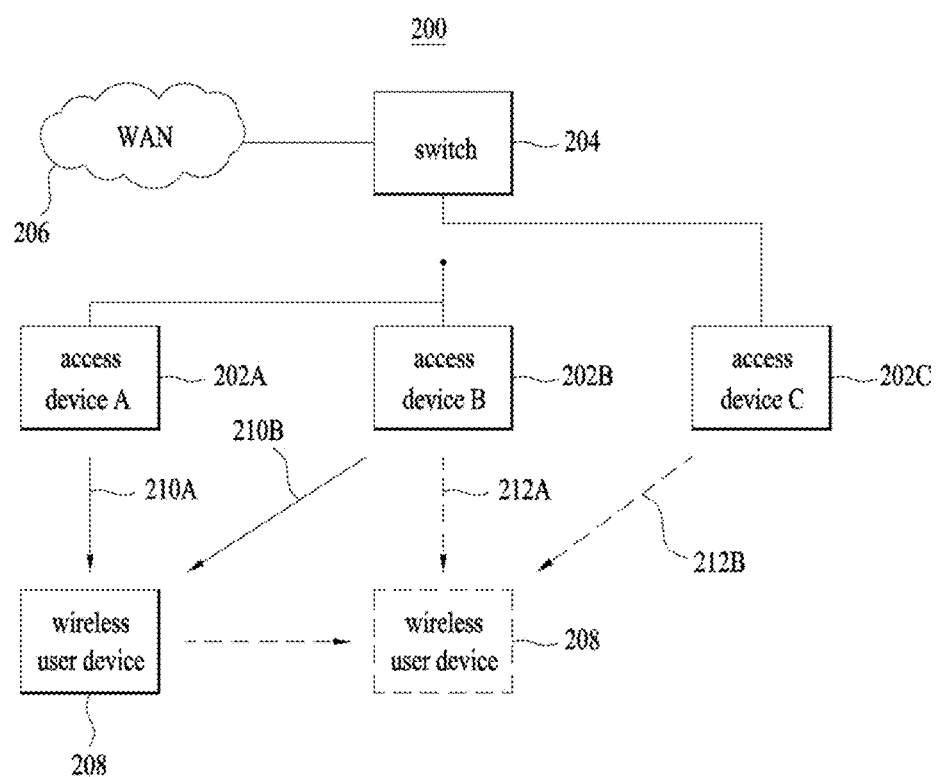
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 may receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 may receive beacons from the access devices 202B/202C.

When the wireless device 208 roams in the total WLAN coverage area provided by the system 200, the wireless device 208 may determine which device provides best access to the wireless device 208. For instance, the wireless device 208 repeatedly smays beacons of adjacent access devices and may be able to measure signal strength (e.g., power) related to each of the beacons. Hence, the wireless device 208 may be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
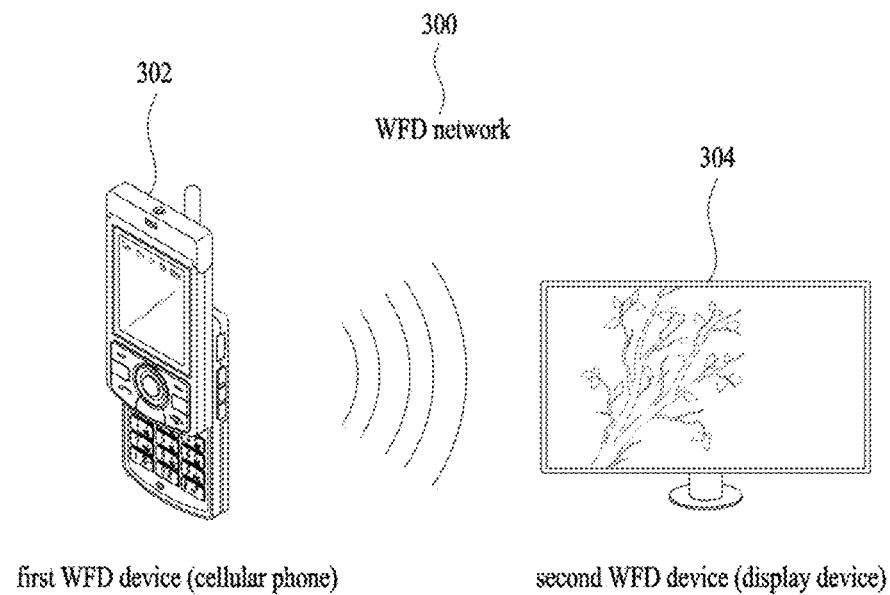
FIG. 3 is a diagram for an example of a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 may include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network may be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) may be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
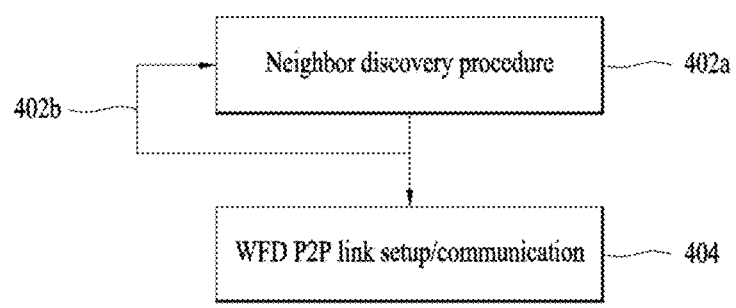
FIG. 4 is a flowchart for an example of a process of configuring a WFD network.

FIG. 4 is a flowchart for an example of a procedure of configuring a WFD network.

Referring to FIG. 4, a procedure of configuring a WFD network may be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association may include identification information on the neighboring WFD device for example. The neighbor discovery procedure may be performed according to an available radio channel [S402b]. Subsequently, the WFD device 302 may perform a WFD P2P link configuration/communication procedure with the different WFD device 304. For instance, the WFD device 302 may determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 may transceive a signal with each other via a P2P link.

Figure 5:
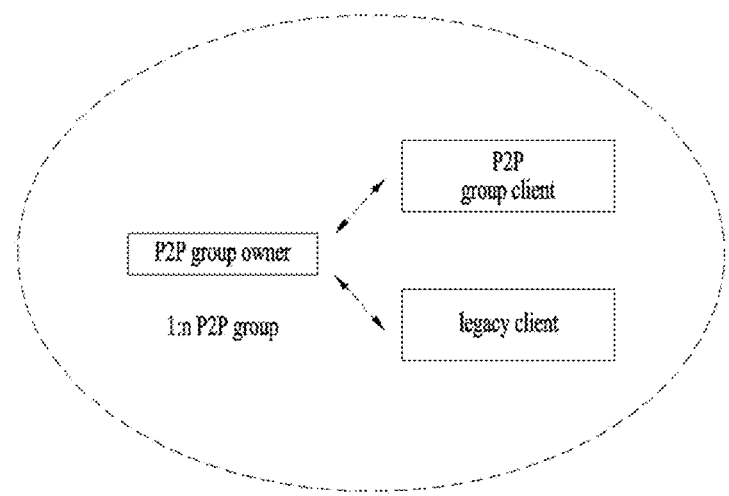
FIG. 5 is a diagram for a typical P2P network topology.

FIG. 5 is a diagram for a typical P2P network topology.

As shown in FIG. 5, a P2P GO may be directly connected with a client including a P2P function. Or, the P2P GO may be connected with a legacy client, which has no P2P function.

Figure 6:
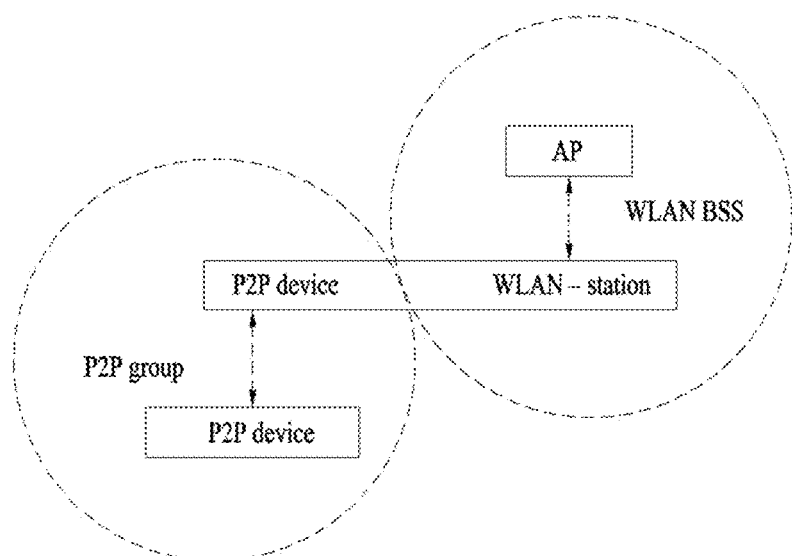
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device may belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n may be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group may be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal may be transmitted by the P2P GO only. A P2P device may quickly check the P2P GO using the beacon signal in a smay phase corresponding to a connection initial phase and performs a role of participating in the group. Or, the P2P GO may initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer may select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client may also inform the P2P GO of connection release. In this case, if possible, it is necessary to perform a disassociation procedure. Having received a connection release request of a client, the P2P GO may identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
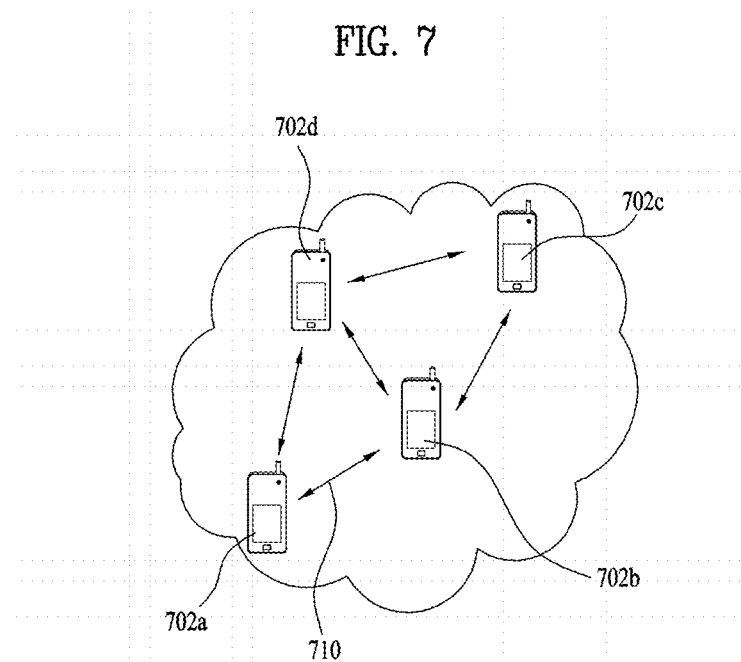
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself may be newly generated or disappeared dynamically/in a short time. Hence, characteristic of the new P2P application part is in that P2P communication may be performed and terminated dynamically/in a short time between a plurality of the P2P devices in dense network environment.

Figure 8:
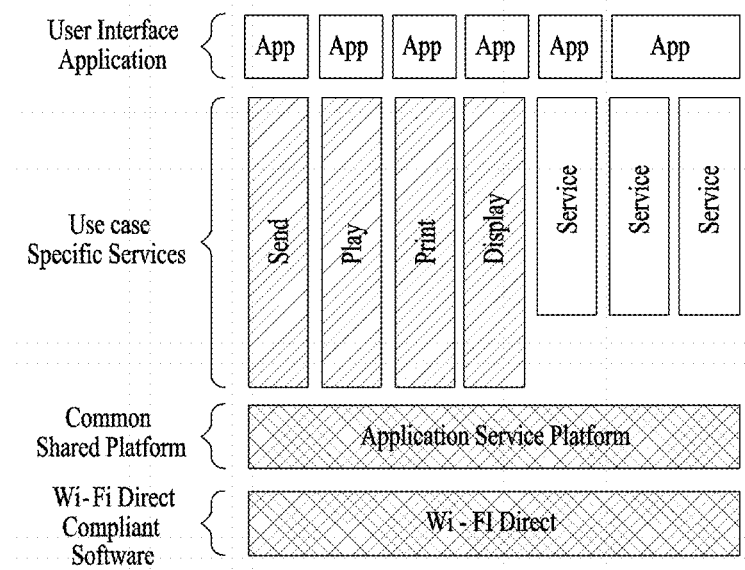
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash may be included in a message as information.

Method of Configuring Legacy WFDS

Figure 9:
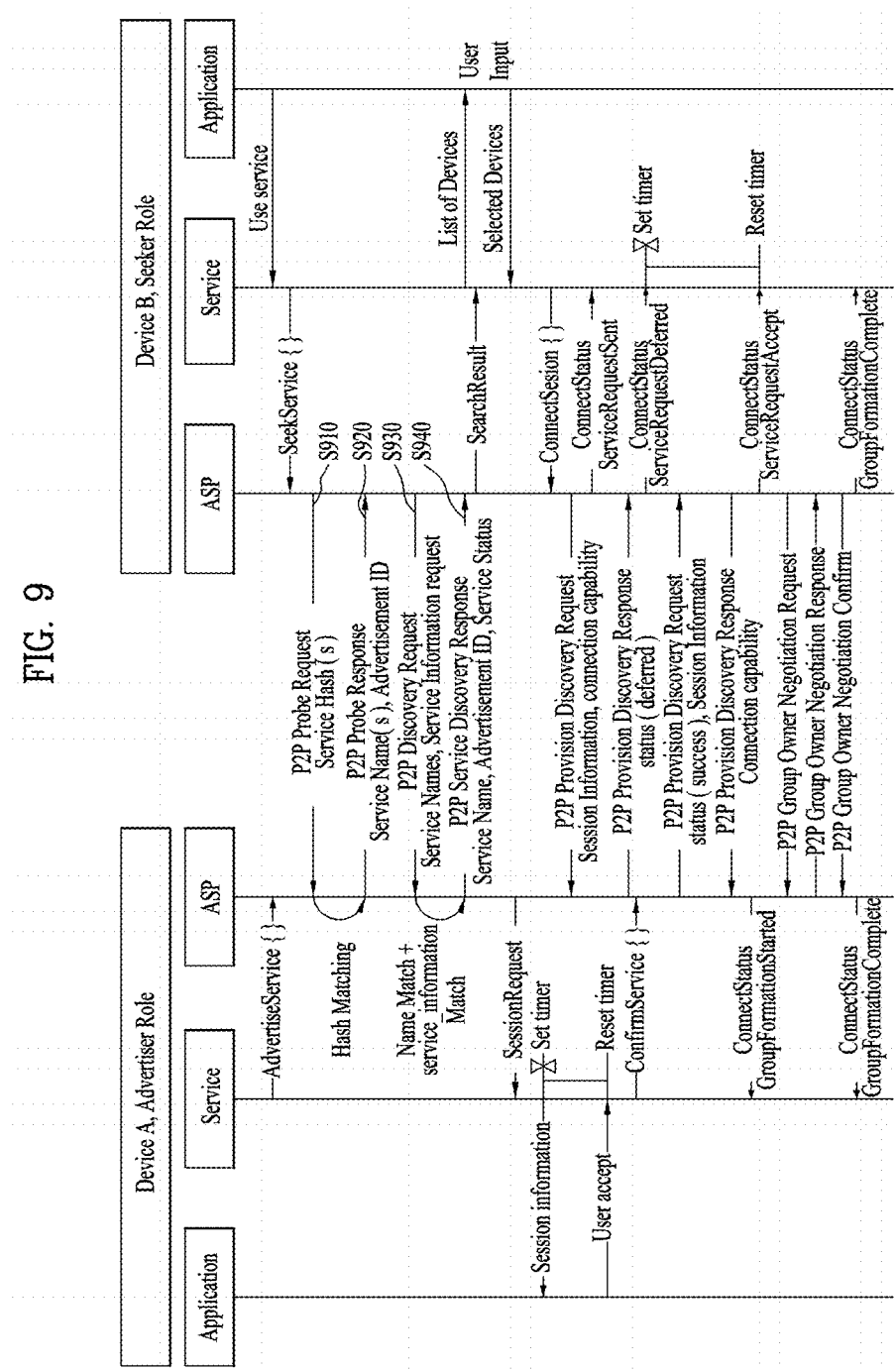
FIG. 9 is a flowchart for a process of establishing a WFDS session by discovering a device and a service between WFDS devices in a legacy WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B may also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B may inform an application and a user of a search result. At this point, a group of Wi-Fi Direct is not formed yet. If a user selects a service and the selected service performs a connect session, P2P group formation is performed.

Before the present invention is explained, it is necessary to be cautious of one thing. It is necessary to distinguish a legacy Wi-Fi Direct connection from Wi-Fi Direct service (WFDS) connection described in the present invention. According to the legacy Wi-Fi Direct, it mainly concerns up to a L2 layer, whereas the recently discussed WFDS connection concerns not only the L2 layer but also a higher layer of the L2 layer. In particular, the WFDS connection is dealing with a service session connection performed by an application service platform. Hence, the WFDS connection may have more diversified and more complex cases compared to the legacy L2 layer connection and it is required to have definition on the cases. In addition, in case of connecting Wi-Fi Direct only between devices and in case of connecting Wi-Fi Direct service between devices, configuration and order of a control frame, which is exchanged via Wi-Fi, may become different.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN devices using a set of the same NAN parameters (e.g., a time period between continuous discovery windows, a period of a discovery window, a beacon interval, a NAN channel, etc.). The NAN devices may configure a NAN cluster. In this case, the NAN cluster uses a set of the same NAN parameters and may correspond to a set of NAN devices synchronized with the same window schedule. A NAN device belonging to the NAN cluster may directly transmit a multicast/unicast NAN service discovery frame to a different NAN device within a range of a discovery window.

And, for example, the NFC may operate on a relatively low frequency band such as 13.56 MHz. In this case, if two P2P devices support the NFC, it may optionally use an NFC channel. A seeker P2P device may discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
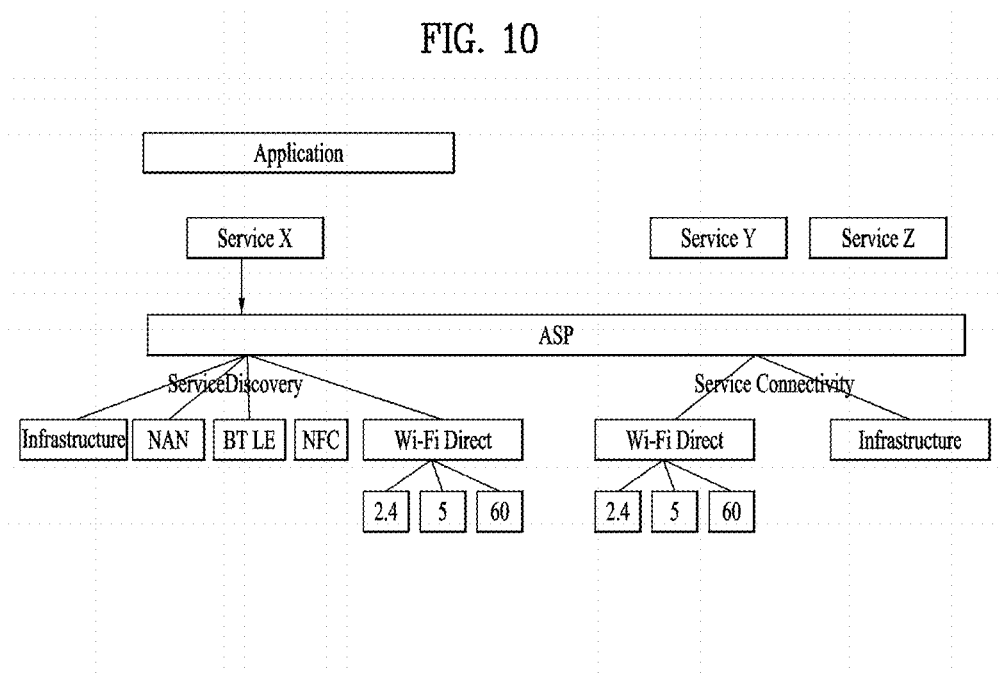
FIG. 10 is a diagram for a service application platform (ASP) supporting a plurality of interfaces.

FIG. 10 is a diagram for a service application platform (ASP) supporting a plurality of interfaces.

As mentioned in the foregoing description, a service end of an advertiser terminal advertises a service capable of being provided by the service end and a service end of a seeker terminal corresponding to a different terminal may indicate an ASP end to search for a target device for which the service is to be used. In particular, it was able to search for and support a service between terminals via the ASP.

In this case, referring to FIG. 10, the ASP may support a plurality of interfaces. In this case, for example, the ASP may support a plurality of interfaces for performing service discovery. And, the ASP may support a plurality of interfaces for performing service connection.

In this case, for example, a plurality of the interfaces for performing the service discovery may correspond to at least one selected from the group consisting of Wi-Fi Direct, NAN (Neighbor Awareness Networking), NFC (Near Field Communication), BLE (Bluetooth Low Energy), and WLAN Infrastructure.

And, a plurality of the interfaces for performing the service connection may correspond to at least one selected from the group consisting of Wi-Pi Direct and Infrastructure. And, for example, the ASP may support a plurality of frequency bands. In this case, for example, a plurality of the frequency bands may correspond to 2.4 GHz, 5 GHz, 60 GHz, and the like. And, for example, the ASP may support information on a frequency band less than 1 GHz. In particular, the ASP may support a plurality of frequency bands and is not restricted to a specific frequency band.

Referring to FIG. 10, a first terminal may perform device discovery or service discovery on a first service using the ASP. Subsequently, if searching for the device discovery or the service discovery is completed, it may perform service connection based on a search result. In this case, for example, an interface used for performing the service discovery may be different from an interface used for performing the service connection. The interfaces may be selected from among a plurality of interfaces.

In this case, it may use information or a parameter for supporting a plurality of the interfaces in the ASP.

Regarding the ASP, for example, a service end of a terminal may obtain information on a service discovery method capable of supporting a first service and a connection method from the ASP. In this case, the first service may correspond to a service provided by the terminal and is not restricted to a specific service.

The service end of the terminal may call AdvertiseService( ) or SeekService( ) method to the ASP based on the information obtained from the ASP. In particular, similar to a legacy ASP operation, the terminal may use the ASP as an advertiser or a seeker to perform service discovery on the first service. After the service discovery is performed on the first service, the terminal may perform service connection based on a result of the service discovery. In this case, the service connection may correspond to a P2P or a WLAN infrastructure. In this case, for example, since both the service connections support a plurality of frequency bands, the service connection may be performed on the basis of a preferred band.

In this case, for example, the information on the service discovery method and the connection method may be represented as table 1 described in the following.

TABLE 1

| Connectivity methods | P2P | Multiband information | 2.4, 5, 60 GHz | |
|---|---|---|---|---|
| | Infrastructure information | | BSSID | |
| | | Multiband information | 2.4, 5, 60 GHz | Channel Index per band |
| Service Discovery methods | | NAN | | |
| | | BTLE | | |
| | | NFC | | |
| | | Infrastructure | | |
| | P2P | Multiband information | 2.4, 5, 60 GHz | |

Figure 11:
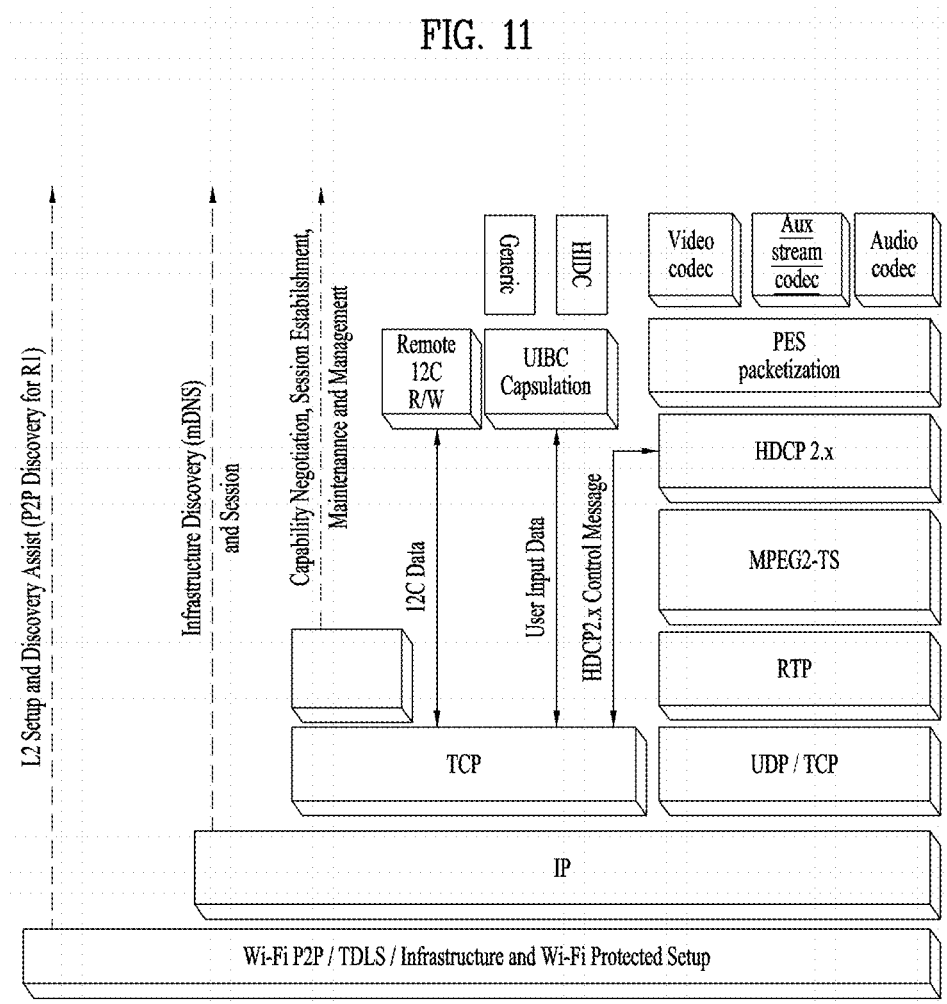
FIG. 11 is a diagram for structures of a data plane and a control plane in a WFD device.

FIG. 11 is a diagram for structures of a data plane and a control plane in a WFD device. In this case, referring to FIG. 11, WFD terminals may perform connection via one selected from the group consisting of Wi-Fi Direct (Wi-Fi P2P), Tunneled Direct Link Setup (TDLS), and Infrastructure. For example, in a legacy system, the WFD terminals were able to perform connection via either Wi-Di Direct or TDLS. However, in a current system, the WFD terminals may perform connection via one selected from the group consisting of Wi-Fi Direct, TDLS, and Infrastructure. And, for example, the WFD terminals may perform the service discovery and the connection based on the ASP, by which the present invention may be non-limited.

And, for example, the WFD terminal may use a TCP (transmission control protocol) as a transport for exchanging control information in a control plane. And, the WFD terminal may use a TCP or a UDP (user data gram) as a transport for exchanging data in a data plane. The TCP and the UDP may correspond to a transport layer protocol. For example, the TCP may check whether or not a transmission is successful by receiving a response from a receiving end. And, the UDP may perform transmission only without receiving a response from the receiving end. Hence, it is able to use the TCP in the control plane to check whether or not a counterpart succeeds in receiving control information. And, it is able to use the TCP or the UDP in the data plane as data information. In this case, since the TCP receives a response, the TCP may have high reliability in transmitting information. However, transmission delay and overhead may increase in the TCP. On the contrary, although transmission delay or overhead is less in the UDP, transmission reliability may be low in the UDP. Hence, when data is transmitted, the TCP or the UDP may be used in consideration of a characteristic of each service, by which the present invention may be non-limited.

In the following description, a method of providing automotive Miracast is explained based on the aforementioned description. In this case, for example, a mobile device may correspond to the aforementioned WFD terminal. And, a vehicle may correspond to the aforementioned WFD terminal. Besides, a moving means may be recognized as a WFD terminal. In the following description, a vehicle or a head unit (hereinafter, HU) of the vehicle may correspond to the aforementioned WFD terminal. And, the aforementioned system and the structure may be applied to the automotive Miracast described in the following, by which the present invention may be non-limited.

In the following, for clarity, such a term as HU is described. Yet, as mentioned in the foregoing description, the HU may correspond to a WFD terminal.

Figure 12:
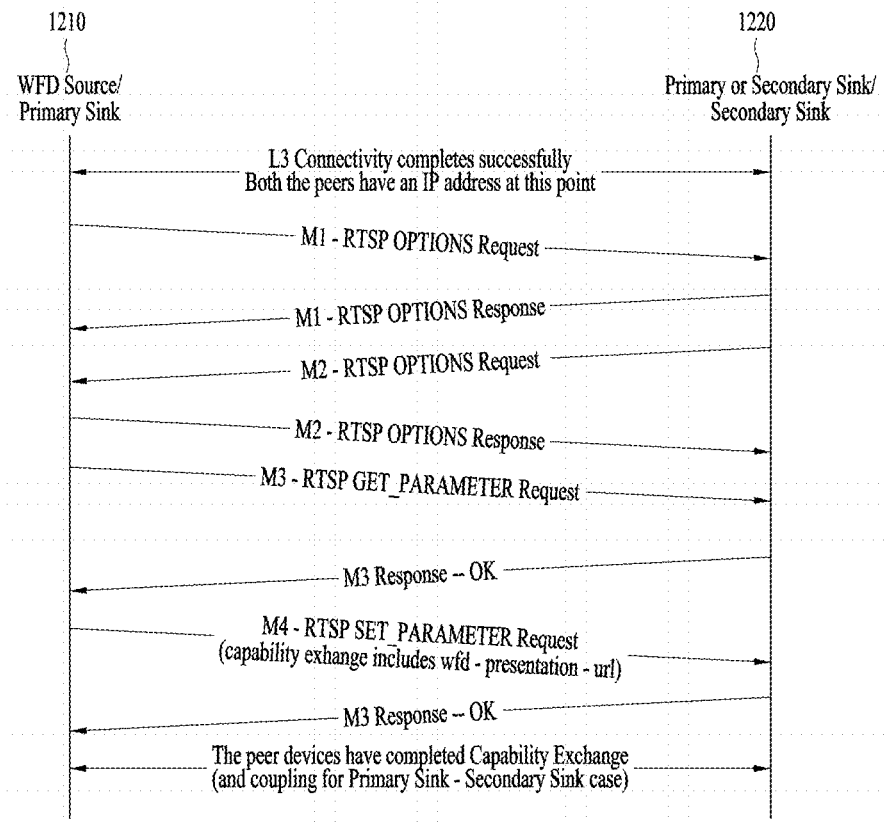
FIG. 12 is a diagram for a method of performing session connection based on an RTSP (real time streaming protocol) message.

FIG. 12 is a diagram for a method of performing session connection based on an RTSP (real time streaming protocol) message.

If the aforementioned WFD terminal is applied to a HU, it may consider a safety for driving a vehicle. More specifically, although information for automotive driving safety is not exchanged in a legacy system for a WFD terminal, if the WFD terminal is applied to the HU, it is necessary to consider the information for automotive driving safety. For example, the information for automotive driving safety may be referred to as automotive Miracast. The present invention is not restricted to the terminology.

And, for example, currently, it may be able to connect a terminal with a vehicle using automotive Bluetooth (BT). However, currently, it is unable to efficiently exchange information on an automatic connection function, a driving control function, and the like using the BT.

Hence, necessary information regarding a vehicle may be exchanged between a terminal and a vehicle via an RTSP message which is used for establishing a session between WFD terminals.

More specifically, referring to FIG. 12, a WFD source terminal 1210 and a WFD sync terminal 1220 may perform session connection based on an RTSP (real time streaming protocol) message. Subsequently, the WFD source terminal 1210 may provide audio/video streaming to the WFD sync terminal 1220 via an RTP (real-time transport protocol) as real-time information.

When the session connection is performed, the WFD source terminal 1210 may transmit an RTSP M1 message to the WFD sync terminal 1220. In this case, the RTSP M1 message may correspond to a message for requesting the initiation of an RTSP procedure. Subsequently, the WFD sync terminal 1220 may transmit an RTSP M2 message to the WFD source terminal 1210. The RTSP M2 message may include information on whether or not it is able to start the RTSP procedure and RTSP option information.

Subsequently, the WFD source terminal 1210 and the WFD sync terminal 1220 may perform a procedure of exchanging an RTSP M3 message and an RTSP M4 message. In this case, the RTSP M3 message and the RTSP M4 message may correspond to a capability negotiation procedure of the WFD source terminal 1210 and the WFD sync terminal 1220. In particular, the WFD source terminal 1210 and the WFD sync terminal 1220 exchange the RTSP M3 message and the RTSP M4 message with each other to exchange capability information on a session connection with each other.

In this case, the WFD source terminal 1210 may correspond to a mobile terminal. For example, the mobile terminal may correspond to a smartphone or a different terminal. And, the WFD sync terminal 1220 may corresponds to a HU. And, the WFD sync terminal 1220 may correspond to a device mounted on a vehicle, by which the present invention may be non-limited. The WFD source terminal 1210 corresponding to a mobile terminal and the WFD sync terminal 1220 corresponding to an HU may exchange at least one of BT address and automotive app whitelist via the M3 message and the M4 message. In particular, the WFD source terminal 1210 and the WFD sync terminal 1220 may exchange address information for using BT. And, the WFD source terminal 1210 and the WFD sync terminal 1220 may exchange Automotive App WhiteList information as an application list capable of being used during driving in consideration of automotive driving safety. The WhiteList may correspond to a predetermined list. The WhiteList may be differently configured according to a manufacturer, by which the present invention may be non-limited. And, for example, it may be able to define a new message exchanged between the WFD source terminal 1210 and the WFD sync terminal 1220. In this case, the message may correspond to M17 and M18 messages. In this case, the M17 and the M18 messages may make information on a vehicle status to be exchanged and perform driving control. In this case, the M17 and the M18 messages may operate based on the aforementioned RTSP. Regarding this, it shall be described later.

In particular, as mentioned in the foregoing description, information on safety and additional information may be exchanged in a system or a structure of a WFD terminal in consideration of automotive communication. In particular, if the WFD terminal is used for a vehicle, it may increase safety of the vehicle.

Table 2 in the following shows the M3 message and the M4 message defined based on ABNF (Augmented Backus-Naur Form) definition. Specifically, the M3 message may include information for configuring "classic" corresponding to a legacy mode and "automotive" corresponding to an automotive mode as WFD source modes.

And, the M4 message may include information for configuring the "classic" and "automotive" corresponding to an automotive mode as WFD sync modes. Or, the M4 message may include information supporting both of the modes.

And, the M3 message may include automotive WFD capability information as capability information. In this case, as shown in table 2, the capability information may include address information and key information. And, as shown in table 2, the M4 message may include automotive WFD BT address information and detail information on each key.

And, an M17 message may correspond to a message for configuring a parameter. For example, the M17 message may set an automotive audio to navigation, entertainment, or an emergency state. Yet, this is an example only and it may change the state as well. The M17 message may include information related to information outputted from the automotive audio, by which the present invention may be non-limited.

More specifically, it may consider tables 4 and 5 described in the following. In this case, as mentioned in the foregoing description, the M3 message and the M4 message may correspond to messages that exchange capability information. In this case, for example, it may be able to define information necessary for using a WFD terminal for a vehicle. For example, an M3 request message may include information requesting at least one of WFD BT info and application list information capable of being used during driving (WFD APP WhiteList under driving). In this case, the M3 request message may be transmitted to a WFD sync terminal corresponding to an HU from a WFD source terminal corresponding to a mobile terminal. In this case, the WFD source terminal may receive am M3 response message from the WFD sync terminal. In this case, the M3 response message may include at least one of WFD BT information and application list information (e.g., T-map, BringGo) capable of being used during driving.

TABLE 2

```
M3_Request :
    wfd-source-mode : "automotive" / "classic" / "both"
M4_Response :
    wfd-sink-mode : : "automotive" / "classic"
M3_Request :
    automotive-wfd-capability : "BTAddr", "ControlKey", "MultimediaKey"
M4_Response :
    automotive-wfd-btaddr : btaddress
    automotive-control-key : "home", "back", "list"
    automotive-multimedia-key : "play", "pause", "fastforward", "fastbackward"
M17(SET_PARAMETER) Request :
    automotive-audio-category : "navigation" / "entertainment" / "emergency"
    automotive-audio-metainfo : songName / artist / genre
    M17 Response – OK.
```

For example, Table 3 shows an RTSP parameter. The RTSP parameter may correspond to a configuration applied to a case of using a session connected with WFD terminals for a vehicle. For example, BT-related information may be defined as WFD BT Info. In this case, as mentioned in the foregoing description, information on the WFD BT Info may be defined by either the M3 message or the M4 message. Regarding this, it shall be described later. And, WhiteList information may be included in the RTSP parameter in consideration of safety during driving. And, as shown in table 3 in the following, if a WFD terminal is used for a vehicle, information may be defined in consideration of whether the vehicle is in a driving state or a stationary state.

Subsequently, the WFD source terminal may transmit information to be actually used to the WFD sync terminal in a manner of including the information in an M4 request message. In this case, the M4 request message may include WFD BT information and application list information capable of being used during driving (WFD APP WhiteList under driving). In particular, information on an application actually used by the WFD source terminal may be transmitted to the WFD sync terminal in a manner of being included in the M4 request message. Subsequently, the WFD sync terminal may transmit an M4 response message to the WFD source terminal as a confirmation message.

TABLE 3

```
wfd-bt-info = "wfd_bt_info:" SP bt-info CRLF
bt-info = "none" / bt-address
bt-address = 12*12HEXDIG
wfd-app-whitelist-under-driving = "wfd_app_whitelist_under_driving:" SP automotive-
info CRLF
automotive-info = "none" / support-app-list
support-app-list = app-name *("," SP support-app-list)
app-name = 1*128CHAR
wfd-restriction-status = "wfd_restriction_status:" SP restriction-status CRLF
restriction-status = "enable" / "disable" ; enable means restriction is enabled and it will
be applied
wfd-driving-status = "wfd_driving_status:" SP driving-status CRLF
driving-status = "driving" / "park"
```

TABLE 4

| | | |
|---|---|---|
| M3 | Request<br>(src -> snk) | GET_PARAMETER rtsp://localhost/wfd1.0 RTSP/1.0<br>CSeq: i+1<br>Content-Type: text/parameters<br>Content-Length: 85<br>wfd_video_formats<br>wfd_audio_codecs<br>wfd bt info<br>wfd app whitelist under driving |
| | Response<br>(snk -> src) | RTSP/1.0 200 OK<br>CSeq: i+1<br>Content-Length: 199<br>Content-Type: text/parameters<br>wfd_video_formats: 00 00 01 01 00000001 00000000 00000000<br>00 0000 0000 00 none none<br>wfd_audio_codecs: LPCM 00000003 00<br>wfd bt info: 001122334455<br>wfd app whitelist under driving: T-map, BringGo |

TABLE 5

| | | |
|---|---|---|
| M4 | Request<br>(src -> snk) | SET_PARAMETER rtsp://localhost/wfd1.0 RTSP/1.0<br>CSeq: i+2<br>Content-Type: text/parameters<br>Content-Length: 190<br>wfd_video_formats: 00 00 01 01 00000001 00000000 00000000<br>00 0000 0000 00 none none<br>wfd_audio_codecs: LPCM 00000002 00<br>wfd bt info: aabbccddeeff<br>wfd app whitelist under driving: T-map |
| | Response<br>(snk -> src) | RTSP/1.0 200 OK<br>CSeq: i+2 |

As a different example, the WFD source terminal and the WFD sync terminal may perform WFD session connection based on the M3 message and the M4 message. In this case, the WFD source terminal may provide an application (or a service) to the WFD sync terminal. In this case, for example, as mentioned in the foregoing description, the WFD source terminal may provide the application to the WFD sync terminal in consideration of whether or not the WFD sync terminal is driving. In this case, if a driving status of the WFD sync terminal is changed, a status of the provided application may be changed as well. To this end, as shown in table 6 in the following, the WFD sync terminal may transmit an M17 request message to the WFD source terminal. The M17 request message may include information (wfd_driving_status) indicating the driving status of the WFD sync terminal. Subsequently, the WFD source terminal may transmit an M17 response message to the WFD sync terminal in response to the M17 request message. By doing so, the WFD source terminal may determine whether to provide an application to the WFD sync terminal. And, as shown in table 17, the WFD source terminal may transmit information (wfd_restriction_status) indicating whether or not driving control is necessary to the WFD sync terminal in a manner of including the information in an M18 request message. Subsequently, the WFD sync terminal may transmit an M18 response message corresponding to a response message to the WFD source terminal. By doing so, the WFD source terminal may control whether to provide an application in consideration of whether or not the WFD sync terminal is driving. Regarding this, it shall be described later.

TABLE 6

| | | |
|---|---|---|
| M17 | Request<br>(snk -> src) | SET_PARAMETER rtsp://localhost/wfd1.0 RTSP/1.0<br>CSeq: i+2<br>Content-Type: text/parameters<br>Content-Length: 29<br>wfd driving status: driving |
| | Response<br>(src -> snk) | RTSP/1.0 200 OK<br>CSeq: i+2 |

TABLE 7

| | | |
|---|---|---|
| M18 | Request<br>(src -> snk) | SET_PARAMETER rtsp://localhost/wfd1.0 RTSP/1.0<br>CSeq: i+2<br>Content-Type: text/parameters<br>Content-Length: 32<br>wfd restriction status: enable |
| | Response<br>(snk -> src) | RTSP/1.0 200 OK<br>CSeq: i+2 |

Figure 13:
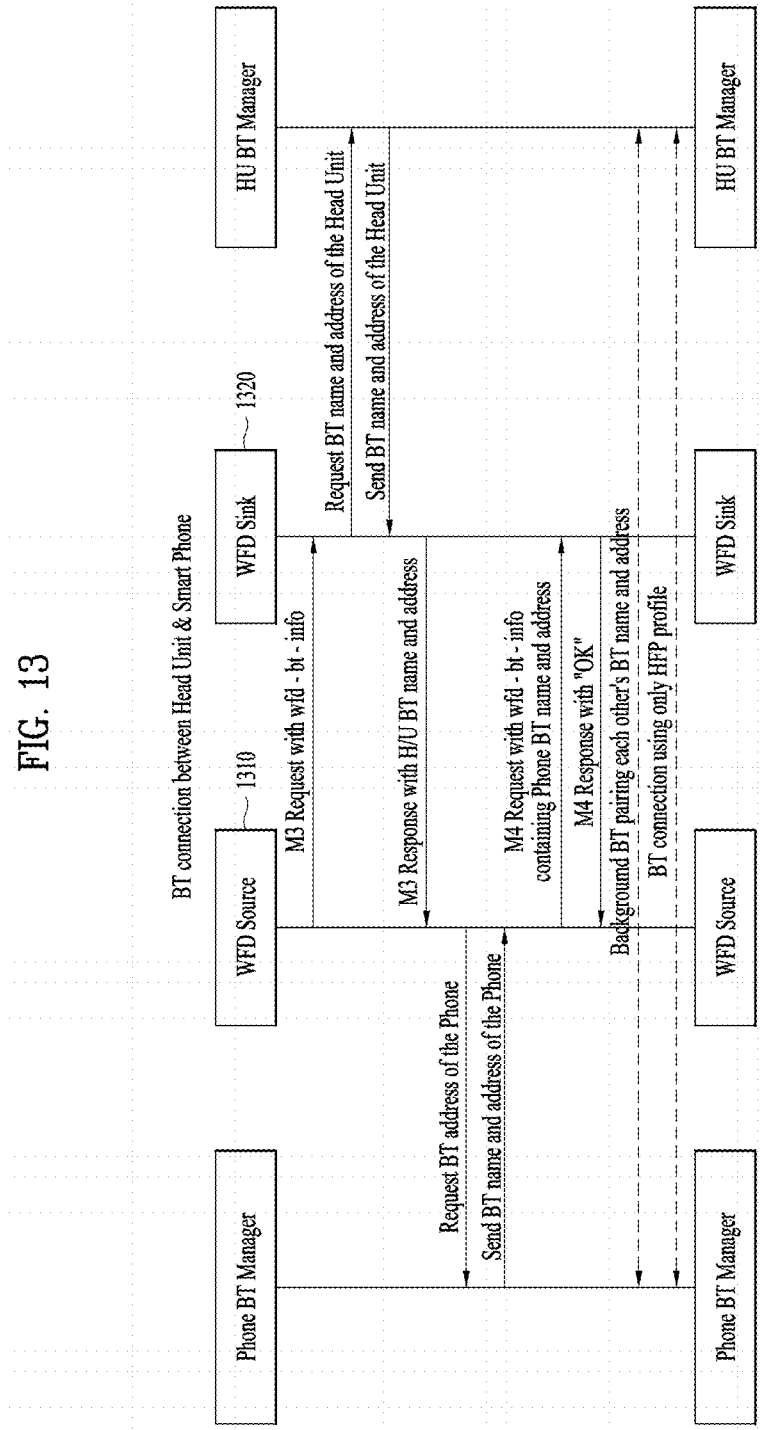
FIG. 13 is a diagram for a method of connecting a WFD session.

FIG. 13 is a diagram for a method of connecting a WFD session.

As mentioned in the foregoing description, a WFD source terminal 1310 and a WFD sync terminal 1320 may perform session connection. In this case, the WFD source terminal 1310 may operate based on a Bluetooth manager (phone BT manager) among a service end and an application end. For example, the BT manager may operate based on the aforementioned ASP. Or, the BT manager may operate based on a higher layer, by which the present invention may be non-limited. And, the WFD sync terminal 1320 may correspond to an automotive terminal or a vehicle. The WFD sync terminal 1320 may operate based on an HU BT manager among a service end and an application end. For example, the BT manager may operate based on the aforementioned ASP. Or, the BT manager may operate based on a higher layer, by which the present invention may be non-limited.

In this case, the WFD source terminal 1310 may transmit an M3 request message including WFD-BT information to the WFD sync terminal 1320. In this case, the WFD sync terminal 1320 may transmit a requested BT name and BT address of an HU to the HU BT manager. Subsequently, the HU BT manager may transmit information on the BT name and the BT address of the HU. In this case, the WFD sync terminal 1320 may transmit an M3 response message including the information on the HU BT name and the BT address to the WFD source terminal 1310 based on the aforementioned procedure. Subsequently, the WFD source terminal 1310 requests BT address of a terminal to the phone BT manager to receive BT name and BT address. Subsequently, the WFD source terminal 1310 may transmit an M4 request message including the BT name and the BT address of the terminal to the WFD sync terminal 1320. The WFD sync terminal 1320 checks the information transmitted from the WFD source terminal 1310 and may transmit an M4 response message to the WFD source terminal 1310 as a confirmation message. Subsequently, the WFD source terminal 1310 and the WFD sync terminal 1320 may establish a session. In this case, the WFD source terminal 1310 and the WFD sync terminal 1320 may form a BT pairing background based on the BT name and the BT address exchanged between the WFD source terminal 1310 and the WFD sync terminal 1320. Subsequently, the WFD source terminal 1310 and the WFD sync terminal 1320 may perform BT connection using HFP (hand free profile) only. In particular, the WFD source terminal 1310 and the WFD sync terminal 1320 may perform session connection for automotive BT using the aforementioned RTSP procedure.

Figure 14:
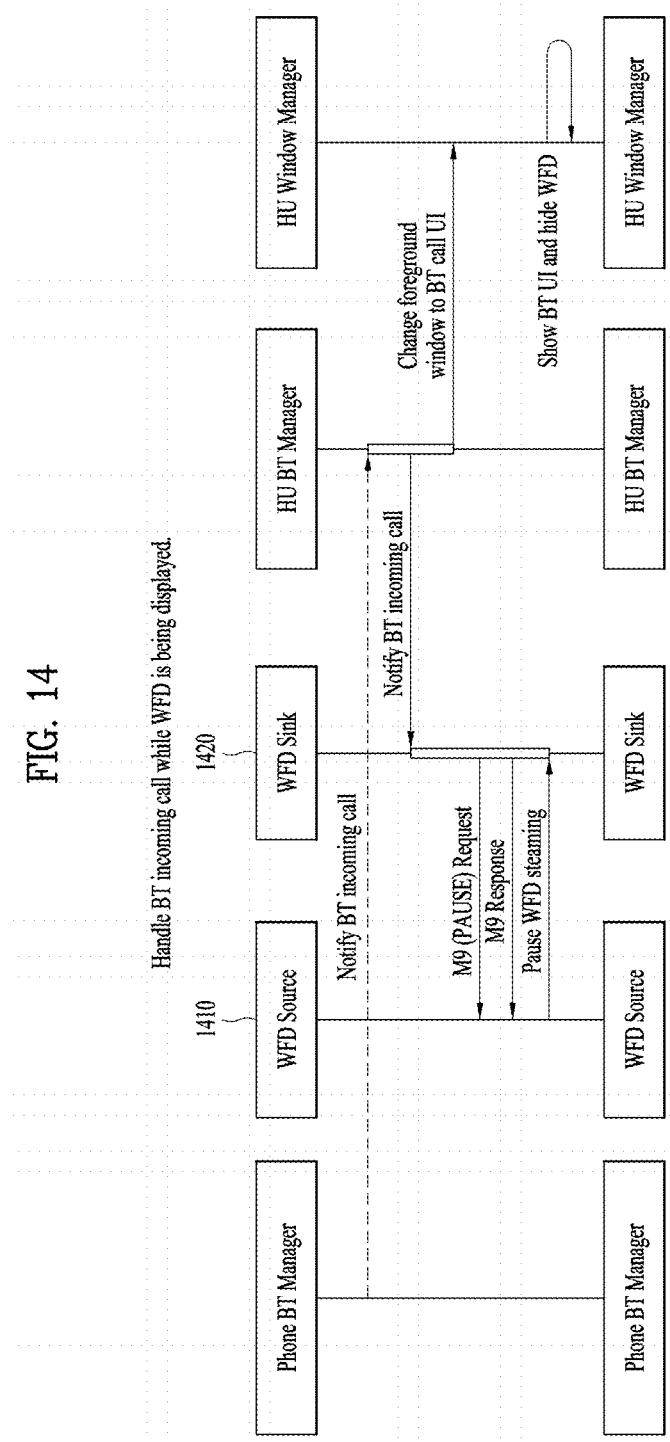
FIG. 14 is a diagram for an operation of a WFD terminal considering incoming call.

FIG. 14 is a diagram for an operation of a WFD terminal considering incoming call.

Referring to FIG. 14, a session may be established between a WFD source terminal 1410 and a WFD sync terminal 1420. In this case, if the WFD source terminal 1410 receives a call, the WFD source terminal 1410 may notify the phone call to the WFD sync terminal 1420. In this case, as an example, a phone BT manager of the WFD source terminal 1410 may inform an HU BT manager of the WFD sync terminal 1420 of information on whether or not a phone call is received. In this case, the HU BT manager may inform a physical layer of the WFD sync terminal 1420 of the information on whether or not a phone call is received. And, the HU BT manager may inform an HU window manager corresponding to a different manager among a service end and an application end of the information on whether or not a phone call is received. The HU window manager may correspond to a manager in charge of display. If the information on whether or not a phone call is received is checked by the HU window manager, the HU window manager may display a screen in a manner of switching the screen into a BT call UI (user interface). And, the WFD sync terminal 1420 transmits an M9 request message to the WFD source terminal 1410 to ask the WFD source terminal to terminate a legacy service and may receive a response from the WFD source terminal in response to the M9 request message. Subsequently, the WFD source terminal 1410 may stop WFD streaming. In particular, a previously provided service may be terminated while a phone call is receiving.

Figure 15:
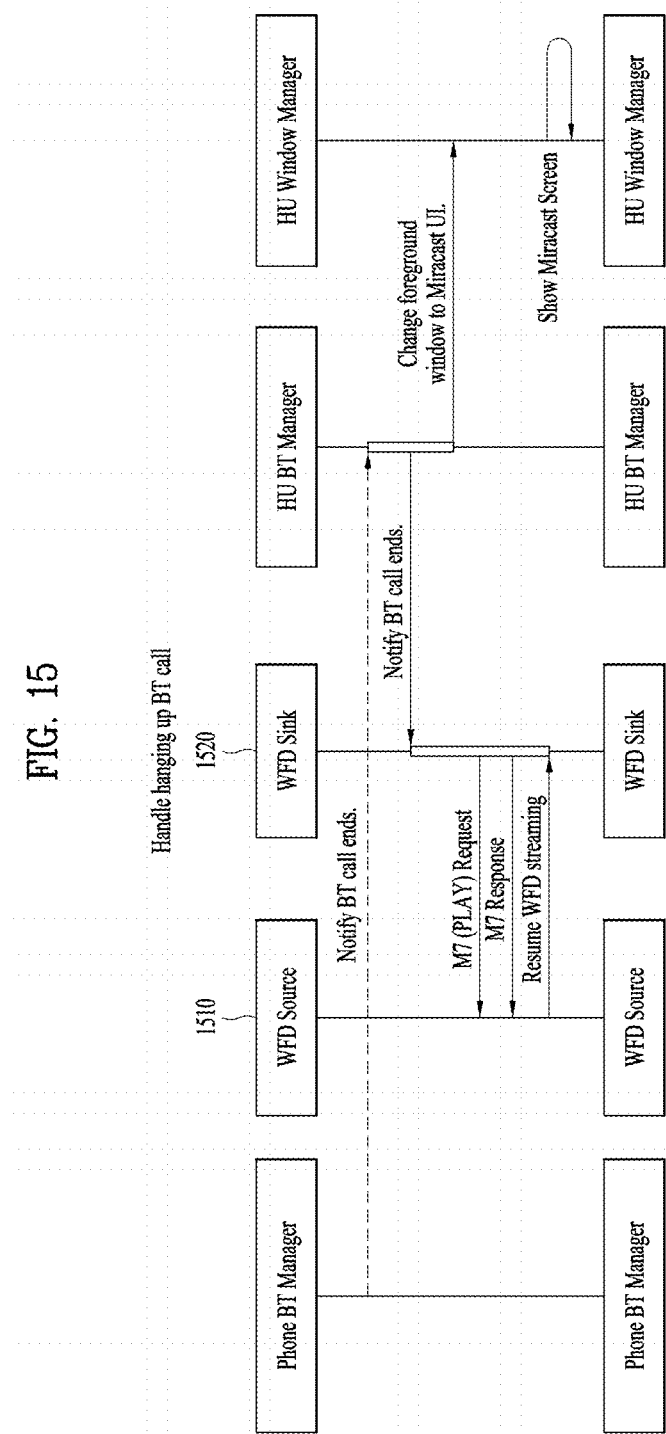
FIG. 15 is a diagram for a WFD operation based on telephone call termination.

FIG. 15 is a diagram for a WFD operation based on telephone call termination.

Referring to FIG. 15, a session may be established between a WFD source terminal 1510 and a WFD sync terminal 1520. In this case, if the reception of the phone call is terminated, the WFD source terminal 1510 may notify the termination of the telephone call to the WFD sync terminal 1520. In this case, as an example, a phone BT manager of the WFD source terminal 1510 may inform an HU BT manager of the WFD sync terminal 1520 of information on whether or not a phone call reception is terminated. In this case, the HU BT manager may inform a physical layer of the WFD sync terminal 1420 of the information on whether or not a phone call reception is terminated. And, the HU BT manager may inform an HU window manager corresponding to a different manager among a service end and an application end of the information on whether or not a phone call reception is terminated. If the information on whether or not a phone call reception is terminated is checked by the HU window manager, the HU window manager may display a screen in a manner of switching the displayed screen into a legacy service UI from a BT call UI. And, the WFD sync terminal 1520 transmits an M7 request message to the WFD source terminal 1510 to ask the WFD source terminal to resume a legacy service and may receive a response from the WFD source terminal in response to the M7 request message. Subsequently, the WFD source terminal 1510 may resume WFD streaming. In particular, if the telephone call reception is terminated, the legacy service may be provided again.

Figure 16:
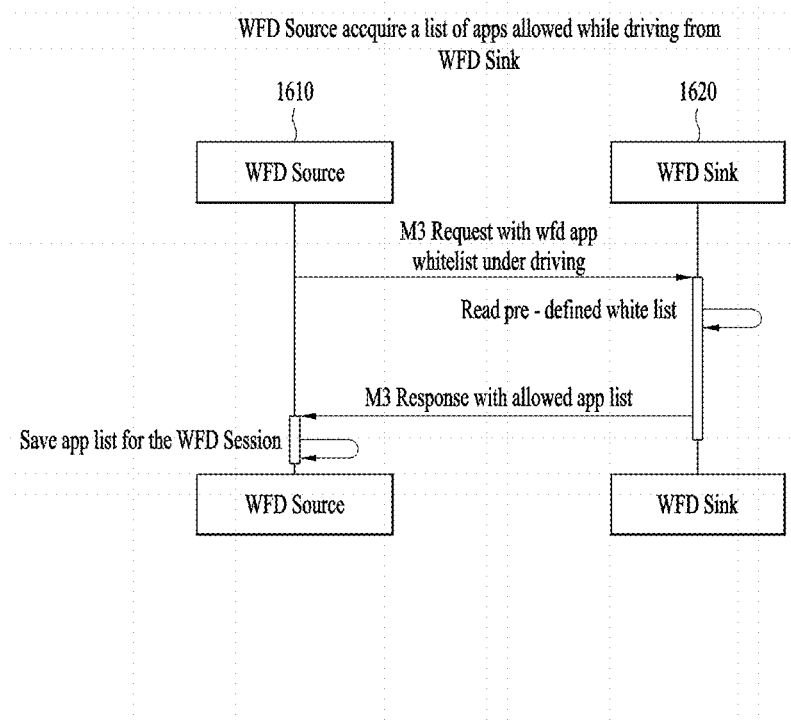
FIG. 16 is a diagram for a method of obtaining whitelist information capable of being executed during driving.

FIG. 16 is a diagram for a method of obtaining whitelist information capable of being executed during driving.

A WFD source terminal 1610 may transmit a message for requesting information on an application capable of being used during driving to a WFD sync terminal 1620. In this case, the message may correspond to the aforementioned M3 request message. In particular, the M3 request message may include a parameter for the aforementioned "WFD APP WhiteList under driving". Subsequently, the WFD sync terminal 1620 may check a predetermined WhiteList. Subsequently, the WFD sync terminal 1620 may transmit an M3 response message to the WFD source terminal 1610 in a manner of including information on a list of available applications in the M3 response message. Subsequently, the WFD source terminal 1610 may store the information on the list of the applications and may determine whether to set a limit on the provided service based on the information. The application WhiteList stored in the WFD source terminal 1610 is valid only when a WFD session is connected. If the WFD session is disconnected, the stored application WhiteList is deleted.

Figure 17:
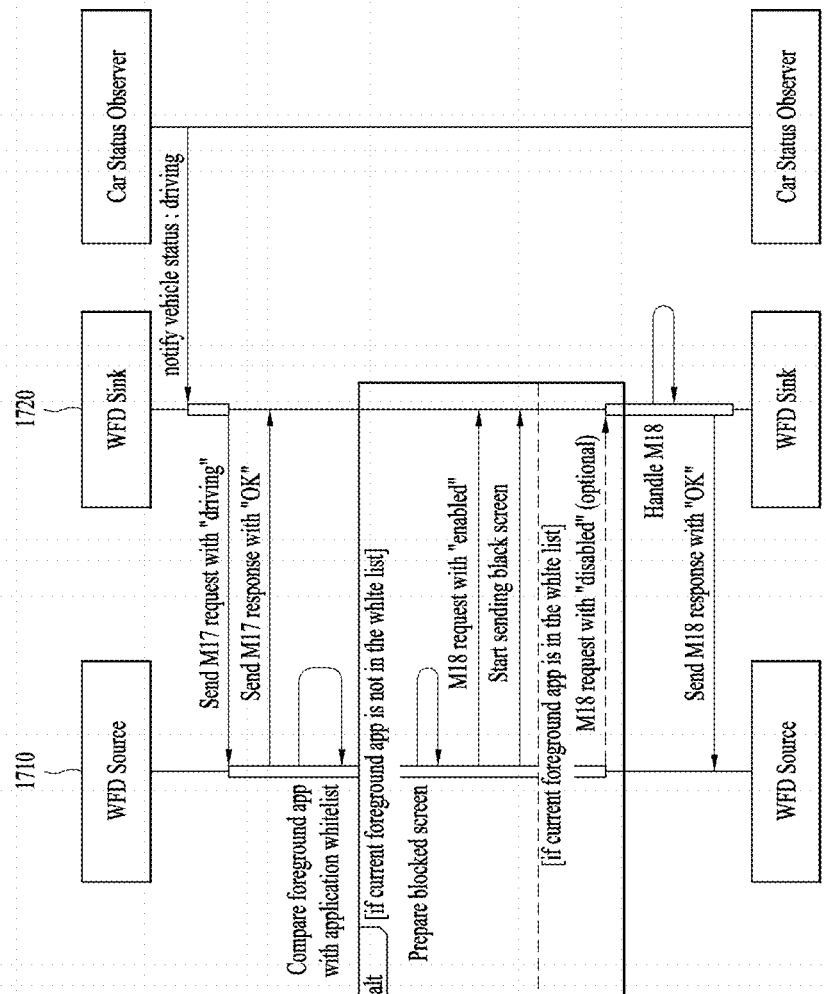
FIG. 17 is a diagram for operations of WFD terminals based on a case of changing a driving status of a vehicle (WFD sync)

FIG. 17 is a diagram for operations of WFD terminals based on a case of changing a driving status of a vehicle (WFD sync).

Referring to FIG. 17, a car status observer may operate as a service/application end of a WFD sync terminal 1720. In this case, the car status observer may inform the WFD sync terminal 1720 of information indicating that a car status is changed to a driving status. The WFD sync terminal 1720 may transmit an M17 request message to a WFD source terminal 1710 in a manner of including the information indicating that the car status is changed to the driving status in the M17 request message. Subsequently, the WFD source terminal 1710 may transmit an M17 response message to the WFD sync terminal 1720. In this case, the WFD source terminal 1710 may compare the aforementioned WhiteList application with a displayed application (foreground application). In this case, for example, if the displayed application is not included in the WhiteList application, the WFD source terminal 1710 may prepare a blocked screen status. Subsequently, the WFD source terminal 1710 may transmit an M18 request message to the WFD sync terminal 1720 in a manner of including the aforementioned "enable" status information in the M18 request message. Subsequently, the WFD source terminal 1710 may provide a blocked screen to the WFD sync terminal 1720. In particular, the "enable" status may indicate that it is unable to display an application in consideration of a driving status. For example, the application incapable of being displayed may correspond to an entertainment application. On the contrary, if the displayed application is included in the WhiteList application, the WFD source terminal 1710 may transmit an M18 request message including "disabled" status information to the WFD sync terminal 1720. In this case, the M18 request message may be optionally transmitted. In particular, the M18 request message may not be transmitted. Subsequently, the WFD sync terminal 1720 may transmit an M18 response message to the WFD source terminal 1710. In this case, the WFD source terminal 1710 may maintain a displayed application. For example, the application included in the WhiteList may correspond to a navigation application, by which the present invention may be non-limited.

Figure 18:
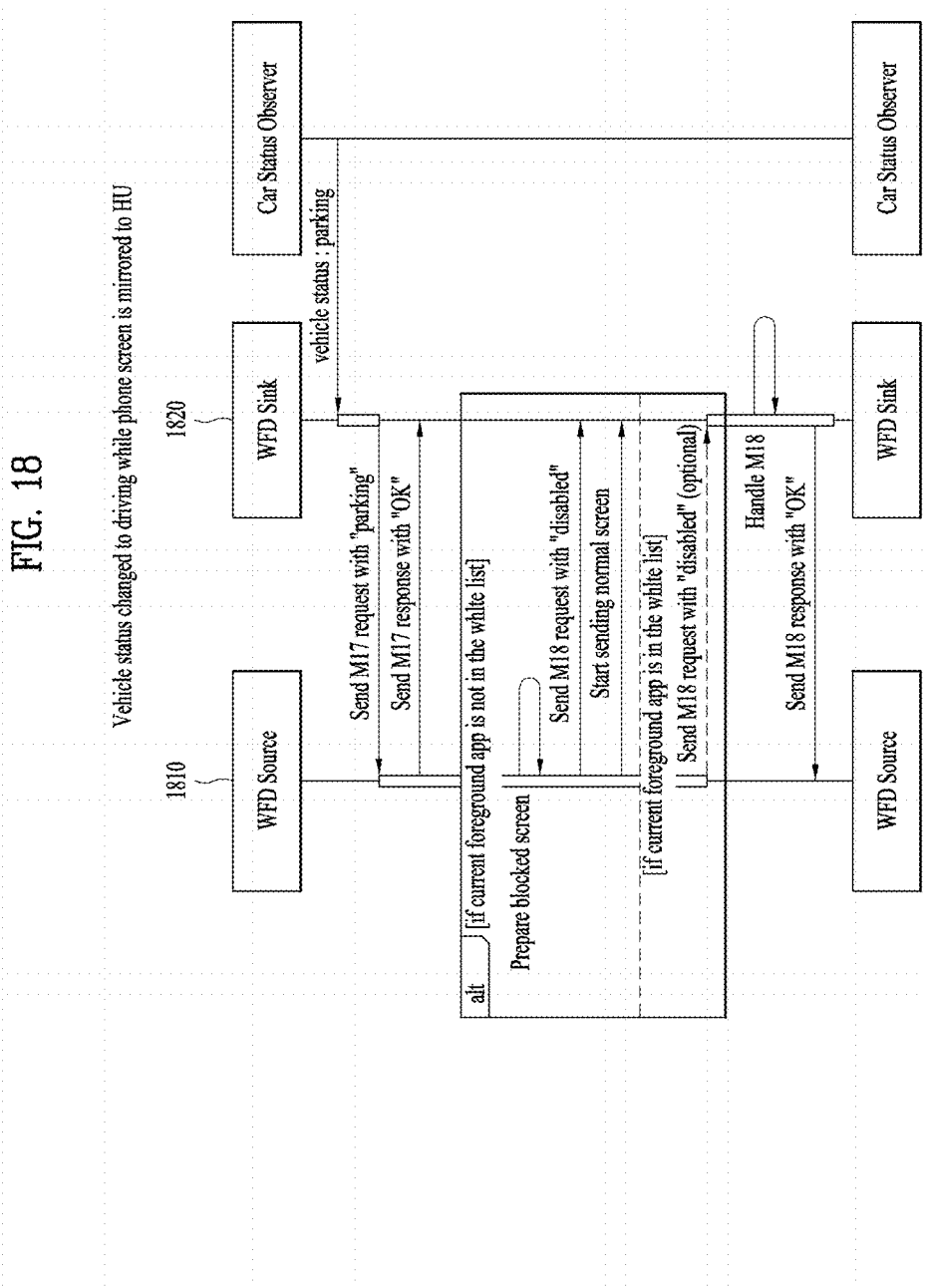
FIG. 18 is a diagram for an operation of a WFD terminal when a vehicle status is changed to a parking status.

FIG. 18 is a diagram for an operation of a WFD terminal when a vehicle status is changed to a parking status.

Referring to FIG. 18, a car status observer may operate as a service/application end of a WFD sync terminal 1820. In this case, the car status observer may inform the WFD sync terminal 1820 of information indicating that a car status is changed to a parking status. The WFD sync terminal 1820 may transmit an M17 request message to a WFD source terminal 1810 in a manner of including the information indicating that the car status is changed to the parking status in the M17 request message. Subsequently, the WFD source terminal 1810 may transmit an M17 response message to the WFD sync terminal 1820. In this case, the WFD source terminal 1810 may check whether or not an application is in a blocked state. In particular, the WFD source terminal 1810 may check whether or not the application is provided by a blocked screen in consideration of a driving status. In this case, for example, if the application is blocked, the WFD source terminal 1810 may prepare a legacy application screen. Subsequently, the WFD source terminal 1810 may transmit an M18 request message to the WFD sync terminal 1820 in a manner of including the aforementioned "disable" status information in the M18 request message. Subsequently, the WFD source terminal 1810 may provide a legacy screen to the WFD sync terminal 1820. On the contrary, if the displayed application is not in the blocked state, the WFD source terminal 1810 may transmit an M18 request message including "disabled" status information to the WFD sync terminal 1820. In this case, the M18 request message may be optionally transmitted. In particular, the M18 request message may not be transmitted. Subsequently, the WFD sync terminal 1820 may transmit an M18 response message to the WFD source terminal 1810. In this case, the WFD source terminal 1810 may maintain a displayed application.

Figure 19:
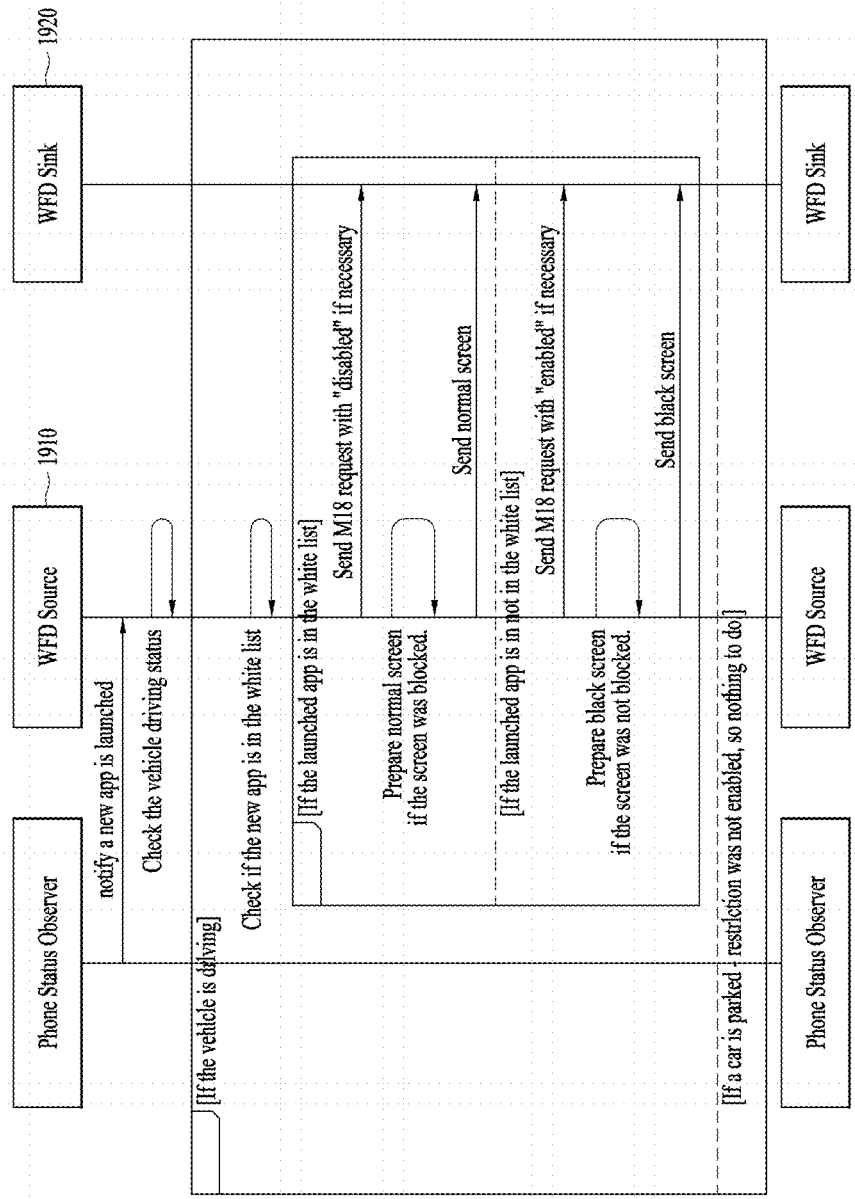
FIG. 19 is a diagram for operations of WFD terminals when a WFD source terminal (mobile terminal) executes a new application.

FIG. 19 is a diagram for operations of WFD terminals when a WFD source terminal (mobile terminal) executes a new application.

Referring to FIG. 19, a WFD source terminal 1910 may operate based on a phone status observer as a service/application end. In this case, the phone status observer may inform the WFD source terminal 1910 that a new application is executed. The WFD source terminal 1910 may check a driving status of the WFD sync terminal 1920 (or a vehicle).

In this case, if the WFD sync terminal 1920 is in a driving status, the EFD source terminal 1910 may check whether or not the new application corresponds to an application included in WhiteList. If the new application is included in the WhiteList, the WFD source terminal 1910 may transmit an M18 request message including "disable" status information to the WFD sync terminal 1920. Subsequently, the WFD source terminal 1910 prepares an execution screen for the application and may be able to provide the execution screen to the WFD sync terminal 1920.

On the contrary, if the new application is not included in the WhiteList, the WFD source terminal 1910 may transmit an M18 request message including "enable" status information to the WFD sync terminal 1920. Subsequently, the WFD source terminal 1910 prepares a blocked screen for the application and may be able to provide the blocked screen to the WFD sync terminal 1920. On the contrary, in this case, if the WFD sync terminal 1920 is in a parking status, the WFD source terminal 1910 may provide the execution screen for the application to the WFD sync terminal 1920 without a separate procedure.

Figure 20:
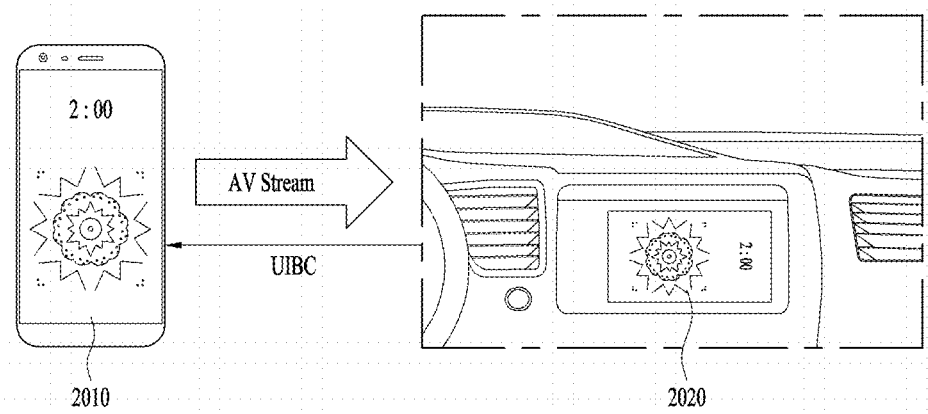
FIG. 20 is a diagram for a method of supporting automotive Miracast based on a WFD terminal.

FIG. 20 is a diagram for a method of supporting automotive Miracast based on a WFD terminal.

Referring to FIG. 20, a mobile terminal 2010 may correspond to the aforementioned WFD source terminal. And, a vehicle or an automotive HU 2020 may correspond to the aforementioned WFD sync terminal. In this case, a legacy WFD terminal was unable to support an automatic BT connection function for making a call. Yet, if a WFD terminal is applied to a vehicle, since it is able to support a telephone call function using BT, as mentioned earlier in FIGS. 12 to 19, it may be necessary to have information on the telephone call function. In particular, for example, the mobile terminal 2010 may provide AV streaming as a WFD terminal. And, the vehicle or the automotive HU 2020 may provide information on a status of the vehicle (e.g., information on whether or not the vehicle is driving) to the mobile terminal 2010. A detail operation is identical to what is mentioned earlier.

Figure 21:
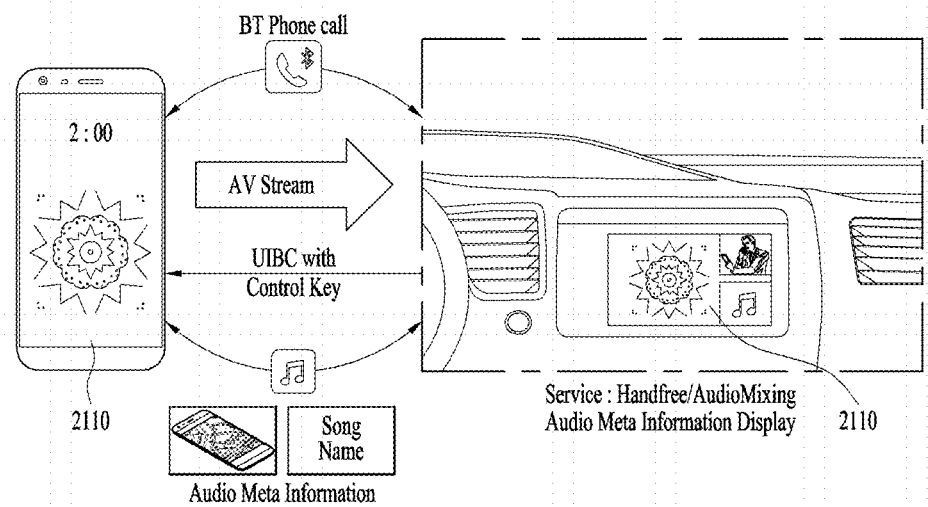
FIG. 21 is a diagram for a method of supporting automotive Miracast based on a WFD terminal.

FIG. 21 is a diagram for a method of supporting automotive Miracast based on a WFD terminal.

Referring to FIG. 21, a vehicle or an HU 2120 of the vehicle corresponding to a WFD sync terminal may provide control key information to a mobile terminal 2110 corresponding to a WFD source terminal. In particular, as mentioned in the foregoing description, the vehicle or the HU 2120 of the vehicle provides WhiteList information to the mobile terminal 2110 in consideration of a driving status of the vehicle and may operate based on a control key. By doing so, the mobile terminal 2110 may provide a blocked screen or an execution screen to the HU 2120 of the vehicle. In this case, for example, each of the information may be exchanged based on the aforementioned RTSP procedure in consideration of an operation of a WFD terminal, by which the present invention may be non-limited.

Figure 22:
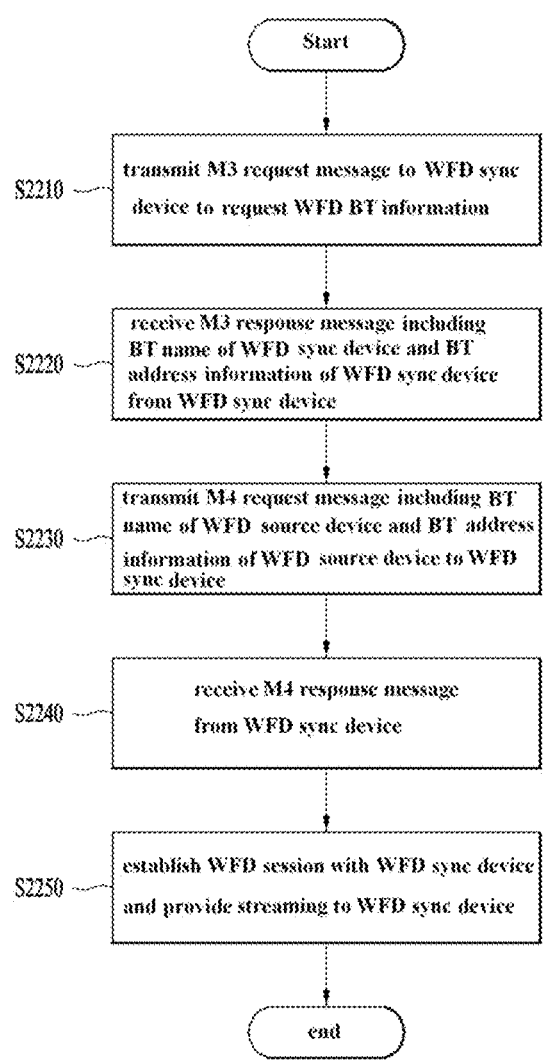
FIG. 22 is a flowchart of a method for a WFD source device to provide streaming according to one embodiment of the present specification.

FIG. 22 is a flowchart of a method for a WFD source device to provide streaming according to one embodiment of the present specification.

Referring to FIG. 22, a WFD source terminal may transmit an M3 request message to a WFD sync terminal to ask the WFD sync terminal to transmit WFD BT information [S2210]. In this case, as mentioned earlier in FIGS. 1 to 21, in order to provide a phone call service via a BT connection between the WFD source terminal and a head unit corresponding to the WFD sync terminal, which are connected with each other via a WFD protocol, in in-vehicle environment, the WFD source terminal may transmit an M3 request message to the WFD sync terminal to ask the WFD sync terminal to transmit WFD BT (WFD Bluetooth) information. The M3 request message may correspond to a message exchanged based on an RTSP procedure. And, for example, the WFD source terminal may correspond to a mobile terminal and the WFD sync terminal may correspond to a vehicle or an HU of the vehicle. In this case, as mentioned in the foregoing description, in case of providing automotive Miracast, as mentioned in the foregoing description, the WFD source terminal and the WFD sync terminal may exchange necessary information with each other in consideration of driving safety of the vehicle.

Subsequently, the WFD source terminal may receive an M3 response message including a BT name of the WFD sync terminal and BT address information of the WFD sync terminal from the WFD sync terminal [S2220]. In this case, as mentioned earlier in FIGS. 1 to 21, the WFD source terminal may obtain the BT name and the BT address information of the WFD sync terminal via the M3 response message using the RTRP procedure. By doing so, it is able to obtain the BT information of the WFD sync terminal corresponding to the vehicle or the HU of the vehicle.

And, for example, the M3 request message may further include whitelist application request information. The WFD sync terminal may transmit the M3 response message in which whitelist application information is included to the WFD source terminal. In this case, a whitelist application of the WFD sync terminal may correspond to an application list capable of being displayed by the WFD sync terminal in a driving status of the WFD sync terminal. For example, as mentioned in the foregoing description, a navigation application may be included in the whitelist application.

Subsequently, the WFD source terminal may transmit an M4 request message including a BT name of the WFD source terminal and BT address information of the WFD source terminal to the WFD sync terminal [S2230]. Subsequently, the WFD source terminal may receive an M4 response message from the WFD sync terminal [S2240]. In this case, as mentioned earlier in FIGS. 1 to 21, the WFD source terminal may transmit the M4 request message to the WFD sync terminal in a manner of including the BT name and the BT address information of the WFD source terminal in the M4 request message using the RTSP procedure. By doing so, the WFD sync terminal may check the BT information of the WFD source terminal and transmit an M4 response message to the WFD source terminal in response to the M4 request message.

Subsequently, the WFD source terminal establishes a WFD session with the WFD sync terminal and may provide streaming to the WFD sync terminal [S2250]. In this case, as mentioned earlier in FIGS. 1 to 21, if the WFD source terminal and the WFD sync terminal establish the session, BT pairing and BT HFP connection may be automatically completed between the WFD source terminal and the WFD sync terminal. By doing so, phone call received from the WFD source terminal, which is connected via WFD in-vehicle environment, and voice call may be provided via a head unit, a microphone, and a speaker mounted on a vehicle.

And, for example, whether or not the WFD source terminal provides streaming may be determined based on whether or not the WFD sync terminal is driving. In particular, WFD driving control may be determined based on whether or not the WFD sync terminal is driving. For example, the M3 request message may further include application whitelist request information, which is defined by vehicle OEM, capable of being used while the WFD sync terminal is driving. The M3 response message may include application whitelist information of the WFD sync terminal. The application whitelist of the WFD sync terminal may correspond to an application list capable of being displayed while the WFD sync terminal is in a driving status. In this case, for example, the application whitelist, which is received from the WFD sync terminal by the WFD source terminal, may be valid only when an established WFD session is maintained. If the WFD session is released, the application whitelist stored in the WFD source terminal may be deleted.

As mentioned in the foregoing description, the WFD sync terminal may correspond to a vehicle or an HU of the vehicle. It may be able to check a driving status or a parking status to check information on whether or not the vehicle is driving.

As mentioned in the foregoing description, if the WFD sync terminal is driving, it may be able to check whether or not an application of a provided streaming is included in a whitelist application of the WFD sync terminal. In this case, if the application of the provided streaming is not included in the whitelist application of the WFD sync terminal, the WFD source terminal may provide a streaming for a blocked screen (black screen) to the WFD sync terminal.

And, for example, if the WFD sync terminal is switched to a parking status from a driving status, the WFD source terminal may receive an M17 request message including information indicating the parking status from the WFD sync terminal. In this case, the WFD source terminal may transmit an M17 response message to the WFD sync terminal based on the M17 request message. In this case, if the WFD source terminal receives the M17 request message while providing a blocked screen to the WFD sync terminal, the WFD source terminal transmits an M18 request message including information indicating an execution screen status to the WFD sync terminal and may provide a streaming for an execution screen to the WFD sync terminal.

Figure 23:
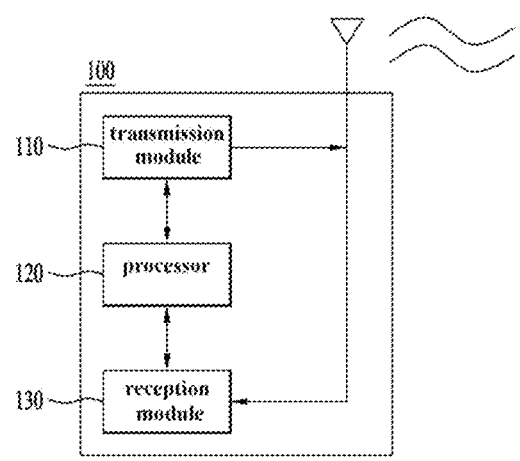
FIG. 23 is a block diagram of a terminal device according to one embodiment of the present specification.

FIG. 23 is a block diagram of a terminal device according to one embodiment of the present specification.

A terminal device may correspond to the aforementioned WFD source terminal or the WFD sync terminal. The terminal device may correspond to a terminal indicating ASP capable of using a plurality of interfaces. In this case, device 100 may include a transmission module 110 configured to transmit a radio signal, a reception module 130 configured to receive a radio signal, and a processor 120 configured to control the transmission module 110 and the reception module 130. In this case, the terminal 100 may perform communication with an external device using the transmission module 110 and the reception module 130. In this case, the external device may correspond to a different terminal device. For example, the external device may correspond to a different terminal connected via P2P or an AP or a non-AP connected via WLAN infrastructure. As a different example, the external device may correspond to a base station. In particular, the external device may correspond to a device capable of performing communication with the terminal device 100, by which the present invention may be non-limited. The terminal device 100 may transmit and receive digital data such as contents using the transmission module 110 and the reception module 130.

And, for example, the terminal device 100 may play a role of a WFD source terminal. And, the terminal device may play a role of a WFD sync terminal.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions may be complementally applied, if necessary.

What is claimed is:

1. A method of providing streaming to a Wi-Fi Direct (WFD) sync device by a WFD source device in a wireless communication system, the method comprising:
    transmitting, to the WFD sync device, a first request message to request WFD Bluetooth (BT) information;
    receiving, from the WFD sync device, a first response message containing a BT name of the WFD sync device and BT address information of the WFD sync device;
    transmitting, to the WFD sync device, a second request message containing a BT name of the WFD source device and BT address information of the WFD source device;
    receiving, from the WFD sync device, a second response message; and
    establishing a WFD session with the WFD sync device and providing streaming to the WFD sync device,
    wherein whitelist application information is included in the first response message,
    wherein the whitelist application information includes information on applications capable of being displayed in consideration of safety while the WFD sync device is driving, and
    wherein the whitelist application information is used while the WFD session is maintained, and deleted in the WFD source device when the WFD session is released.

2. The method of claim 1, wherein whether the streaming is provided based on whether the WFD sync device is driving.

3. The method of claim 2, wherein the first request message includes a request for the whitelist application information.

4. The method of claim 3, wherein whether an application of the provided streaming is contained in the whitelist application information is configured, when the WFD sync device is driving.

5. The method of claim 4, wherein a steaming for a blocked screen is provided to the WFD sync device when the application of the provided streaming is not contained in the whitelist application information.

6. The method of claim 4, wherein a third request message containing information on a parking status is received from the WFD sync device and a third response message is transmitted to the WFD sync device based on the third request message, when the WFD sync device is switched to the parking status from a driving status.

7. The method of claim 6, wherein a fourth request message containing information on a status of an execution screen is transmitted to the WFD sync device and a streaming for the execution screen is provided to the WFD sync device, when the third request message is received in a state of providing a blocked screen to the WFD sync device.

8. The method of claim 1, wherein the WFD source device is a mobile device and the WFD sync device is a vehicle or a head unit (HU) of the vehicle.

9. A Wi-Fi Direct (WFD) source device providing streaming to a WFD sync device in a wireless communication system, the WFD source device comprising:
    a reception module configured to receive information from an external device;
    a transmission module configured to transmit information to the external device; and
    at least one processor configured to control the reception module and the transmission module,
    wherein the at least one processor is configured to:
    control the transmission module to transmit, to the WFD sync device, a first request message to request WFD Bluetooth (BT) information,
    control the reception module to receive, from the WFD sync device, a first response message containing a BT name of the WFD sync device and BT address information of the WFD sync device,
    control the transmission module to transmit, to the WFD sync device, a second request message containing a BT name of the WFD source device and BT address information of the WFD source device,
    control the reception module to receive, from the WFD sync device, a second response message, and
    establish a WFD session with the WFD sync device and provide streaming to the WFD sync device,
    wherein whitelist application information is included in the first response message,
    wherein the whitelist application information includes information on applications capable of being displayed in consideration of safety while the WFD sync device is driving, and wherein the whitelist application information is used while the WFD session is maintained, and deleted in the WFD source device when the WFD session is released.

10. The WFD source device of claim 9, wherein whether the streaming is provided is based on whether the WFD sync device is driving.

11. The WFD source device of claim 10, wherein the first request message includes a request for the whitelist application information.

12. The WFD source device of claim 11, wherein whether an application of the provided streaming is contained in the whitelist application information is configured, when the WFD sync device is driving.

13. The WFD source device of claim 12, wherein a steaming for a blocked screen is provided to the WFD sync device when the application of the provided streaming is not contained in the whitelist application information.

14. The WFD source device of claim 12, wherein a third request message containing information on a parking status is received from the WFD sync device and a third response message is transmitted to the WFD sync device based on the third request message, when the WFD sync device is switched to the parking status from a driving status.

15. The WFD source device of claim 14, wherein a fourth request message containing information on a status of an execution screen is transmitted to the WFD sync device and a streaming for the execution screen is provided to the WFD sync device when the third request message is received in a state of providing a blocked screen to the WFD sync device.

* * * * *